United States Patent [19]

Kiefer

[11] 4,361,493

[45] Nov. 30, 1982

[54] HYDROPHILIC SUBSTRATE FOR SORBING HEAVY METALS

[75] Inventor: John E. Kiefer, Kingsport, Tenn.

[73] Assignee: Eastman Kodak Company, Rochester, N.Y.

[21] Appl. No.: 164,372

[22] Filed: Jun. 30, 1980

[51] Int. Cl.$^3$ .......................... C08J 5/18; C08L 1/10; C08L 3/04; C09K 3/00
[52] U.S. Cl. ................................. 252/184; 106/168; 106/194; 106/214; 106/217
[58] Field of Search ............... 252/184; 106/168, 194, 106/213, 214, 217; 427/343; 523/310

[56] References Cited

U.S. PATENT DOCUMENTS 3,347,968 10/1967 Thomas et al. .................... 264/195

FOREIGN PATENT DOCUMENTS 546360 2/1977 U.S.S.R. .

*Primary Examiner*—Allan Lieberman
*Attorney, Agent, or Firm*—Malcolm G. Dunn; Daniel B. Reece, III

[57] ABSTRACT

Method for making a water insoluble hydrophilic polymeric substrate having incorporated therein a dispersion of a finely precipitated metal sulfide for sorbing by ion exchange heavy metals from aqueous solutions such as photographic solutions, seawater, mine tailings, electroplating baths and the like, the substrate being formed from such polymers as cellulose esters, cellulose ethers, starches cross-linked to render them water insoluble, natural polymers, or regenerated cellulose; and the product of the method.

14 Claims, No Drawings

HYDROPHILIC SUBSTRATE FOR SORBING HEAVY METALS

DESCRIPTION

1. Technical Field

My invention is directed to a method for making a water insoluble hydrophilic polymeric substrate for sorbing by ion exchange heavy metals from aqueous solutions, such as sorbing silver, bismuth, copper, lead, mercury and gold; and to the product of the method.

In industry, it is desirable to recover silver from spent photo-processing solutions and precious metals from electroplating baths. It is also desirable to sorb heavy metals from seawater and mine tailings.

2. Description of Prior Art

It is known that metal ions may be removed from solutions containing them by bringing the solution into contact with a particulate body containing at least one solid, substantially insoluble metal sulfide. The metal ions are retained by the sulfide particles for subsequent removal by suitable procedures. For instance, the Kraus et al. patent, U.S. Pat. No. 3,317,312, discusses the prior use of cadmium sulfide for sorbing copper ions through a chemical exchange reaction in which the copper displaces an equivalent amount of cadmium in the cadmium sulfide. The patentees assert that they have discovered that extremely rapid adsorption of metal ions by insoluble metal sulfides is possible by their process in which an insoluble metal sulfide is employed in solid, ground or powdered particulate form of a size providing the desired contact characteristics. The metal sulfide is to be selected so that the sulfide particles are permeable to the metal ion to be removed from the solution in concern. By being "permeable to the ion," it is meant that the metal ion is capable of permeating into the interior of the solid sulfide particles in the solution. The insoluble metal sulfide used for the adsorption must be more soluble than the sulfide metal of the metal ion desired to be removed from the solution. In other words, the sulfide of the metal ion in solution must be more insoluble than the metal sulfide employed in particulate form as the adsorbent. One specific application mentioned is the recovery of silver from various wastes and dilute solutions including spent photographic fixer solutions by passing the solution through a column or cartridge, such as a chromatographic column, of a selected metal sulfide. Some such insoluble sulfides mentioned include copper, cadmium, zinc, iron, lead or arsenic sulfide. The essence of the invention, according to the patentees, appears to be that they found that reactions of sulfides with ions in solution could occur rapidly with bulk sulfide, rather than being spread as a thin layer over a large excess of surface-active diluent.

Separation of silver and other heavy metals from aqueous solutions by precipitation as sulfide salts followed by filtration or centrifugation is thus well known in the art. These methods are also known to be slow and expensive.

Thomas et al. in U.S. Pat. Nos. 3,347,968 and 3,408,291 discloses a method of producing metal sulfide containing "shaped bodies" of regenerated cellulose and of other materials capable of swelling in water. The shaped bodies, such as fiber, foil or the like, have incorporated therein metal sulfides, as disclosed, as the element arsenic or antimony. The metal sulfide-incorporated shaped bodies are prepared by dissolving salts of metal-forming sulfides (antimony and arsenic) which are soluble in alkaline solutions in viscose, and forming by the viscose process the shaped objects. Products formed in this way are said to react with other metals such as zinc, iron, copper, lead and silver. Because, however, arsenic and antimony sulfides are soluble in alkaline solution (and also decompose in water), the shaped bodies or products containing them are not very useful in ion exchange columns or absorption columns. The patentees thus claim that these products can be converted to products containing more stable sulfide salts such as zinc or iron sulfide. This conversion, however, releases into the waste streams arsenic or antimony, either of which poses a serious environmental problem.

Russian Pat. No. 546,360, applied for on Oct. 9, 1974 and published on Feb. 15, 1977, discloses the use of cellulose fiber containing zinc sulfide for recovering silver from industrial waste solutions including waste photographic solutions. There is no disclosure, however, of the manner in which the zinc sulfide is introduced in the cellulose fiber. Also there is no description of the character of the cellulose involved.

An object of the present invention, therefore, is to provide a more direct method for producing a hydrophilic substrate having incorporated therein zinc sulfide, ferric or ferrous sulfide, or cupric or cuprous sulfide, and thus (1) does not require the use of arsenic or antimony and (2) that will efficiently absorb heavy metal ions such as bismuth, cadmium, copper, lead, mercury, silver and gold.

Another object of the invention is to provide a hydrophilic substrate, as made from the method, for sorbing by ion exchange heavy metals.

Other objects of the invention will become apparent to those skilled in the art to which this invention pertains from the description given herein.

DISCLOSURE OF THE INVENTION

In accordance with the present invention, I provide a method for making a hydrophilic substrate for sorbing by ion exchange heavy metals by incorporating in a hydrophilic polymeric substrate a metal chloride, and then treating the metal chloride incorporated substrate with a sulfide donor to convert the metal chloride to a dispersion of a finely precipitated metal sulfide within the substrate.

The hydrophilic substrate resulting from practice of this invention may sorb by ion exchange silver from a waste photographic solution. Some other heavy metals that may also be sorbed include bismuth, copper, lead, mercury and gold.

The hydrophilic polymeric substrate is formed from a polymer that should be water insoluble and be a solvent for the metal chloride. The polymer must also provide a suitable medium for the reaction of the metal chloride with a sulfide ion to produce a finely precipitated metal sulfide. Furthermore, the polymer must be permeable to heavy metal ions and provide a medium for the reaction of the precipitated metal sulfide with other heavy metal ions. Suitable polymers are cellulose esters such as cellulose acetate, cellulose propionate, cellulose butyrate, and mixed esters thereof; cellulose ethers such as water insoluble hydroxy ethyl cellulose; starches cross-linked to render them water insoluble; natural polymers such as wood pulp, cotton, hemp, jute, sisal, flax, kapok, and coconut shell fibers; and regenerated cellulose such as viscose rayon.

The metal chloride, which may be selected from zinc chloride, ferric or ferrous chloride or cupric or cuprous chloride, is incorporated in the hydrophilic polymeric substrate by treating the substrate with the metal chloride in an aqueous or alcoholic solution. The aqueous or alcoholic solution may contain about 20 to about 70% metal chloride, and preferably contains about 25 to about 45% metal chloride. Although an aqueous solution is preferred, particularly from an economic view, other solvents for the metal chlorides, such as from aliphatic alcohols selected from methanol, ethanol or propanol, may also be used.

The sulfide donor for treating the metal chloride incorporated substrate to convert the metal chloride to a dispersion of finely precipitated metal sulfide within the substrate may be selected from hydrogen sulfide, or an aqueous solution of sodium sulfide, potassium sulfide, ammonium sulfide or thioacetamide. The hydrophilic substrate with the as-converted metal sulfide may comprise about 5 to about 50% by weight metal sulfide, and preferably about 15 to about 40% by weight metal sulfide. Preferably, also, the sulfide donor is a water soluble salt in an aqueous solution comprising about 1% to a saturated solution in the aqueous solution, and still more preferably, about 5% to a saturated solution. A saturated solution contains about 16% of the water soluble salt.

Preferably still, the hydrophilic polymeric substrate is a cellulose ester and the metal chloride is incorporated in the substrate by dissolving the cellulose ester and the metal chloride in a volatile solvent for the cellulose ester to form a liquid solution, forming the substrate from the liquid solution and then evaporating the volatile solvent. The volatile solvent may be selected from acetone or methylene chloride containing about 10% methanol. Other volatile solvents that may be used include other esters, ketones and chlorinated hydrocarbons commonly used to dissolve the particular cellulose ester of concern.

Since all of the resulting characteristics of the hydrophilic substrate, as treated in the manner disclosed herein, may not be known or readily identifiable and therefore not completely definable in a product claim per se, I also claim as my invention the product resulting from the practice of the method, especially in light of the fact that my product in most of the instances sorbs a greater percentage of silver, for instance, than that disclosed, for instance, in U.S. Pat. Nos. 3,347,968 and 3,408,291 metioned above.

BEST MODE FOR CARRYING OUT THE INVENTION

As mentioned above, the invention disclosed herein, therefore, concerns a method for making a hydrophilic substrate for sorbing by ion exchange heavy metals; and the product of the method.

The hydrophilic substrate for sorbing by ion exchange heavy metals in an aqueous solution may be in the form of a film, fiber, fabric or the like, in which a metal chloride incorporated in the substrate as disclosed herein has been converted to a dispersion in the substrate of a finely precipitated metal sulfide by a sulfide ion donor, as heretofore indicated.

The metal chloride per se may be incorporated in the hydrophilic substrate by treating the substrate with the metal chloride in an aqueous or alcoholic solution. The aqueous or alcoholic solution my contain about 20% to about 70% metal chloride, and preferably may contain about 25% to about 45% metal chloride.

The metal chloride per se may also be incorporated in the above-mentioned cellulose ester substrate by dissolving a cellulose ester and the metal chloride in a volatile solvent for the cellulose ester to form a liquid solution, then forming a material from the liquid solution by casting into thin films or spinning into fibers or coated on a porous, high surface area material such as a foam or fibrous mass. The solvent is next evaporated, and then the resulting substrate is treated with a water soluble sulfide salt in an aqueous solution to convert the metal chloride to a metal sulfide.

In the use of cellulose ester, the cellulose ester must be soluble in a volatile organic solvent and be compatible with zinc chloride, ferric or ferrous chloride, or cupric or cuprous chloride in solution, in the instance when the metal chloride is incorporated in the cellulose ester by dissolving the cellulose ester and the metal chloride in such volatile solvent to form the above-mentioned liquid solution. The solvent in this case must be a volatile one in order that a substrate may result from spinning or casting or coating upon evaporation of the solvent. Preferred solvents include acetone, and methylene chloride containing about 10% methanol. Other volatile solvents, as previously mentioned, may include other esters, ketones and chlorinated hydrocarbons commonly used to dissolve the particular cellulose ester of concern.

The metal chloride used must be soluble in the volatile solvent employed, and must be compatible with the cellulose ester of concern. As mentioned above, the preferred metal chloride is selected from zinc, copper and iron.

The water soluble sulfide salt for treatment of the metal chloride incorporated hydrophilic substrate may be selected, preferably, from sodium sulfide, ammonium sulfide and potassium sulfide, for the purpose of converting the zinc chloride or ferric or ferrous chloride or cupric or cuprous chloride, respectively, to a water insoluble zinc sulfide, ferric or ferrous sulfide or cupric or cuprous sulfide. The chloride washes out. The water soluble sulfide salt comprises about 5% to about 50% by weight of the hydrophilic substrate, and preferably comprises about 15% to about 40% by weight of the hydrophilic substrate.

The water soluble sulfide salt also comprises about 1% to a saturated solution (about 16% for sodium sulfide, for instance) in the aqueous solution for treating the hydrophilic substrate, and preferably about 5% to about 16%.

The water soluble sulfide salt is a strong base and may saponify the cellulose ester, for instance, to form cellulose; however, this saponification does not impair the desirable properties of the product. The base of the hydrophilic substrate will thus be at least partially saponified, depending, for instance, upon the amount of water-soluble sulfide salt in the aqueous solution used to treat the hydrophilic substrate and the length of treatment time. Sodium hydroxide may be added to the water soluble sulfide solution to promote saponification of the cellulose ester.

The substrate, after treatment with the sulfide salt, must be hydrophilic.

In order for the product to be significantly effective in sorbing heavy metals, it must be porous and should have a surface area of at least 50 square centimeters (cm$^2$) per cubic centimeter (cm$^3$) volume. In whatever form the substrate takes, whether by spinning the solution into fibers, casting the solution into thin films, or coating a porous, high surface area such as a foam or fibrous mass with the solution, the outer 10 millimicron of the surface of the porous substrate will be impregnated with a finely-precipitated zinc sulfide or ferric or ferrous sulfide or cupric or cuprous sulfide, as the case may be.

The following chemical equations show the reactions that take place when a cellulose ester material having a metal chloride incorporated therein is treated:

(Ferric)    $2 FeCl_3 + 3 Na_2S \rightarrow Fe_2S_3 + 6 NaCl$ (Ferrous)    $FeCl_2 + Na_2S \rightarrow FeS + 2 NaCl$ $ZnCl_2 + Na_2S \rightarrow ZnS + 2 NaCl$ (Cupric)    $CuCl_2 + Na_2S \rightarrow CuS + 2 NaCl_2$ (Cuprous)    $2 CuCl + Na_2S \rightarrow Cu_2S + 2 NaCl$ The following chemical equations show the reactions that take place when a hydrophilic substrate having therein a dispersion of finely precipitated zinc sulfide is contacted by an aqueous solution having silver therein:

$ZnS + 2[Ag^+Cl^-]$
$(Na_2S_2O_3)] \rightarrow Ag_2S + ZnCl_2 - Na_2S_2O_3$

The examples and tables below result from the codissolving of metal chlorides with cellulose acetate in a solvent and then subsequently forming films or fibers, followed by treatment of such films or fibers with sodium sulfide. Products containing cupric, zinc and ferric sulfide were found to sorb up to 40% silver by weight. Ferric sulfide was found to oxidize when stored in water. Sorption properties were found to be controlled mainly by sulfide concentration and degree of dispersion and by surface area of the sorbent.

The film was prepared, for instance, from 10 parts of cellulose acetate dissolved in 80 parts acetone in a Waring blender. The metal chloride was dissolved in about five parts ethanol and was slowly added to the cellulose acetate solution with mixing. The clear solution was cast onto a glass plate. After evaporation of the solvent, the film was treated with an aqueous solution of sodium sulfide, and then water washed and dried. In testing for metal sorption, a 150 milligram sample of film (or fiber, as the case may be) was shaken in 25 milliliters of 0.7% silver chloride in a photographic fixer solution. The sample was water washed, dried and then analyzed for silver pickup by atomic absorption.

This invention will be further illustrated by the following examples although it will be understood that these examples are included merely for purposes of illustration and are not intended to limit the scope of the invention.

EXPERIMENTS

1. Comparison of Soluble and Insoluble Salts

Metal chlorides and zinc sulfide (18.5 milliequivalent of metal) were each mixed into 10 grams of cellulose acetate (having an acetyl content of about 39.9% and a hydroxyl content of about 3.2% in accordance with ASTM D-871-63, with a viscosity of about 25.0 seconds at 95.0 poises in accordance with ASTM D-871-63 (Formula A) and D-1343-56, and a melting range of about 240° C. to 260° C.) dissolved in 90 milliliters of acetone. The metal chlorides dissolved; the zinc sulfide was dispersed. All the metal salts were analytical grade.

Each solution was cast onto a glass plate and, after evaporation of the acetone, the films were peeled off the plates. Each film was cut into two pieces. One piece was exposed to a hydrogen sulfide atmosphere for two hours, then flushed with nitrogen. It was then treated in 5% silver nitrate solution for 30 minutes, water washed and dried. The other section of film was treated for two hours in 5% aqueous sodium sulfide, water washed, then treated in the 5% silver nitrate solution for 30 minutes, water washed and dried. Each sample was analyzed for metals by atomic absorption. The results are shown in Table 1.

2. Effect of Zinc Chloride Concentration

Zinc chloride was dissolved into a cellulose acetate solution and cast into films as in Experiment 1. The dried films were treated for 40 minutes in 16% sodium sulfide solution, water washed and dried. The dried films were about 75μ thick. They were evaluated for silver sorption by the screen test already described. The amount of zinc chloride used, the time of treatment in the silver solution and the amount of silver sorbed are shown in Table 2.

3. Effect of Film Thickness

Films were prepared and treated as in Experiment 2, but the film thickness was varied. Each sample contained 0.3 parts zinc chloride per part cellulose acetate. Film thickness, treatment time in silver solution and amount of silver sorbed are shown in Table 3.

4. Fibers Containing Zinc Sulfide

A cellulose acetate spinning solution was mixed with the appropriate amount of zinc chloride until the zinc chloride was completely dissolved. The solutions were spun into 5 denier per filament fibers containing 30% zinc chloride. The fibers were treated with 16% aqueous sodium sulfide for two minutes to convert the zinc chloride to zinc sulfide. The fibers were treated with silver chloride solution. Results are listed in Table 4.

5. Stability of Films Containing Ferric Chloride

Cellulose acetate (10 parts) was dissolved in acetone (80 parts) in a Waring blender. Ferric chloride (0.84 grams) dissolved in 2 milliliters water and 5 milliliters ethanol was mixed into the cellulose acetate solution. The solution was cast into a film about 33μ thick. After drying it was treated for 40 minutes in 16% sodium sulfide solution, washed and dried. The film was cut into ¾ inch × ¾ inch strips and stored under various conditions. Each sample was treated for one hour with a solution of 0.6% AgCl in Kodak Rapid Fix (a product of Eastman Kodak Company). Storage conditions and silver sorption are shown in Table 5.

Comparison of Soluble and Insoluble Metal Salts

Zinc sulfide dispersed in a cellulose acetate film did not sorb silver from an aqueous solution very efficiently (Table 1). However, zinc chloride and other metal chlorides which were soluble in the casting solution were readily converted to their sulfide salts. These sulfide salts were extremely well dispersed as evidenced by the transparency of the films. Probably because of this dispersion, these films were quite effective for sorbing silver.

Considerably more work would be needed to determine optimum treatment conditions sufficient to compare the effectiveness of the various chloride salts. For practical reasons, ferric and zinc chloride were chosen for more extensive evaluation. Copper is somewhat toxic to aquatic life and therefore would be less desirable for use in applications where the metal may be released to the environment. Manganese sulfide is somewhat water soluble and may be leached out of the film more readily than the other salts.

Effect of Zinc Chloride Concentration on Silver Sorption

As expected, the amount of zinc salt in the film affects the rates and amount of silver pickup (Table 2). Increasing zinc concentration affects increased silver pickup.

Effect of Film Thickness on Silver Sorption

It is obvious from the data in Table 3 that the sorption rate is diffusion controlled. A film 191μ thick, which had a surface area of about 37 square centimeters/gram, sorbed 21% by weight silver after a four-hour treatment. A similar sample 33μ thick had a surface area of about 216 square centimeters/gram sorbed about 40% by weight silver. Energy dispersive X-ray analysis of film cross-sections indicated that the silver permeates approximately 10μ into the films.

Sorption Properties of Fibers Containing Zinc Sulfide

The data in Table 4 indicate that silver is sorbed by fibers more rapidly than by films. The surface area of the fibers (about 2000 square centimeters/gram) is about 10 times that of the corresponding films.

Stability of Films Containing Ferric Sulfide

It appears that films containing ferric sulfide effectively sorb silver from fixer solutions. The films are stable when stored in closed bottles whether or not the bottles are flushed with nitrogen. However, samples stored in water for one week partially oxidized to iron oxide.

TABLE 1

| | Comparison of Metal Sulfides | | | |
|---|---|---|---|---|
| Salt | Treatment | Appearance | Ag, % | Me+, % |
| 9.0% ZnS | None | White | 0.6 | 4.4 Zn |
| 11.8% FeCl$_2$ | H$_2$S | Orange | 1.3 | 0.8 Fe |
| | Na$_2$S | Transparent | 9.2 | 1.4 Fe |
| 8.4% FeCl$_3$ | H$_2$S | Yellow | 2.4 | 0.7 Fe |
| | Na$_2$S | Transparent | 7.7 | 0.3 Fe |
| 18.3% CuCl | H$_2$S | Green | 10.5 | 2.0 Cu |
| | Na$_2$S | Transparent | 22.5 | 0.1 Cu |
| 15.8% CuCl$_2$ 2 H$_2$O | H$_2$S | Green | 15.1 | 0.6 Cu |
| | Na$_2$S | Transparent | 5.8 | 0.1 Cu |
| 18.3% MnCl$_2$ 4 H$_2$O | H$_2$S | Milky | 6.2 | 0.3 Mn |
| | Na$_2$S | Milky | 5.4 | 1.2 Mn |
| 12.6% ZnCl$_2$ | H$_2$S | Clear | 1.5 | 0.5 Zn |
| | Na$_2$S | Clear | 7.1 | 4.3 Zn |

TABLE 2

| | Amount of Zinc Chloride vs. Silver Sorption | | | | | |
|---|---|---|---|---|---|---|
| Sample | Amount ZnCl Parts | Treatment Time, Min.[1] | Zinc Content %[2] | Meq.[3] | Silver Content %[2] | Meq.[3] |
| 1A | 0.1 | 30 | 4.8 | 1.5 | 7.0 | 0.7 |
| 1B | 0.1 | 60 | 3.9 | 1.2 | 9.8 | 0.9 |
| 1C | 0.1 | 240 | 2.0 | 0.6 | 14.3 | 1.3 |
| 2A | 0.2 | 30 | 8.1 | 2.5 | 9.0 | 0.8 |
| 2B | 0.2 | 60 | 8.5 | 2.6 | 9.9 | 0.9 |
| 2C | 0.2 | 240 | 6.6 | 2.0 | 16.0 | 1.5 |
| 3A | 0.3 | 30 | 14.6 | 4.5 | 11.2 | 1.0 |
| 3B | 0.3 | 60 | 11.6 | 3.6 | 18.6 | 1.7 |
| 3C | 0.3 | 240 | 9.6 | 3.0 | 25.7* | 2.4* |

[1]Time of treatment in fixer solution
[2]Percent metal based on weight of sorbent
[3]Milliequivalent of metal per gram of sorbent
*Estimate based on Zn analysis
Films were treated with Na$_2$S for 40 minutes
Films were about 75 μ thick

TABLE 3

| | Effect of Film Thickness on Silver Sorption | | | | | |
|---|---|---|---|---|---|---|
| Sample | Film Thickness,μ | Treatment Time, Min. | Zinc Content %[1] | Meq.[2] | Silver Content %[1] | Meq.[2] |
| D1 | 33 | 0 | 19.3 | 5.9 | — | — |
| D2 | 33 | 30 | 12.0 | 3.7 | 17.5 | 1.6 |
| D3 | 33 | 60 | 12.8 | 3.9 | 16.5 | 2.5 |
| D4 | 33 | 240 | 7.7 | 2.4 | 40.3 | 3.8 |
| A1 | 56 | 0 | 17.2 | 5.3 | — | — |
| A2 | 56 | 30 | 13.7 | 4.2 | 16.1 | 1.5 |
| A3 | 56 | 60 | 10.4 | 3.2 | 20.5 | 1.9 |
| A4 | 56 | 240 | 10.1 | 3.1 | 33.6 | 3.1 |
| B1 | 97 | 0 | 15.9 | 4.9 | — | — |
| B2 | 97 | 30 | 15.1 | 4.6 | 8.7 | 0.8 |
| B3 | 97 | 60 | 13.8 | 4.2 | 11.2 | 1.0 |
| B4 | 97 | 240 | 9.7 | 3.0 | 23.0 | 2.1 |
| C1 | 191 | 0 | 17.2 | 5.3 | — | — |
| C2 | 191 | 30 | 15.6 | 4.8 | 6.1 | 0.6 |
| C3 | 191 | 60 | 14.5 | 4.5 | 11.1 | 1.0 |
| C4 | 191 | 240 | 9.0 | 2.8 | 21.4 | 2.0 |

[1]Percent metal based on weight of sorbent before treatment
[2]Milliequivalent of metal per gram of sorbent before treatment

TABLE 4

| | Sorption of Silver by Fibers Containing Zinc Sulfide | | | | |
|---|---|---|---|---|---|
| Sample | Treatment Time, Min. | Zinc Content %[1] | Meq.[2] | Silver Content %[1] | Meq.[2] |
| 4 | 0 | 18.8 | 5.8 | 0 | — |
| 1 | 30 | 9.5 | 2.9 | 22.0 | 2.1 |
| 2 | 60 | 7.7 | 2.4 | 24.0 | 2.2 |
| 3 | 240 | 4.7 | 1.4 | 28.0 | 2.6 |

[1]Percent metal based on weight of sorbent
[2]Milliequivalent of metal per gram of sorbent

TABLE 5

| Stability of Films Containing Ferric Sulfide | | |
|---|---|---|
| Storage Conditions | Storage Time, Weeks | Silver Sorption, %[1] |
| In air in closed bottle | Fresh | 16 |
| | 1 | 16 |
| | 2 | 18 |
| | 4 | 13 |
| | 7 | 19 |
| In closed bottle flushed with nitrogen | Fresh | 16 |
| | 1 | 9 |
| | 2 | 17 |
| | 4 | 17 |
| | 7 | 17 |
| In distilled water | Fresh | 16 |
| | 1 | 9 dark red patches |
| | 16 | |

[1]Films were treated with silver chloride in fixer solution for one hour

It was thus discovered that cellulose films and fibers containing dispersions of finely precipitated metal sulfides can be prepared by fairly simple methods. Films and fibers containing such dispersions of metal sulfides sorb up to 40% of their weight in silver from photographic fixer solutions. Sorption efficiency is controlled mainly by the amount and the degree of dispersion of the metal sulfide and by the surface area of the film or fiber. Sulfides found to be effective were iron, zinc and copper. However, iron sulfides were not stable to storage in aqueous solution.

Although the work described above was directed toward the recovery of silver, it is obvious that this concept may provide means for recovery of heavy metals in general, particularly where they are present in very low concentrations. It should find application in the metal plating industry for mitigation of waste streams and for recovery of valuable metals. Another useful application will be for recovery of precious metals from surface waters, mine tailings and sea water. Mitigation of waste streams in the chemical, electrical, and electronic industries are further applications. Recovery of valuable catalyst in the petroleum and chemical industries are obvious applications.

The following examples result from treating a hydrophilic substrate with a metal chloride salt dissolved in water. After this treatment, the fiber is dried, then wetted thoroughly in a water solution of sodium sulfide-sodium hydroxide. The finished product was found to be capable of sorbing in excess of 30% of its own weight in silver from a photographic fixer solution.

EXAMPLE 1

A 150 denier cellulose acetate yarn was drawn across the top surface of a rotating lubricating roll. The lower surface of the roll was immersed in a water solution containing 30% zinc chloride. The yarn picked up solution from the roll and, after drying, contained 9.19% zinc. The treated yarn was soaked for four minutes in an aqueous solution of 10.6% sodium sulfide and 12.5% sodium hydroxide, then water washed and dried at room temperature. The yarn contained 14.4% zinc as zinc sulfide. A 150 milligram sample of yarn in a vial containing 25 milliliters of Kodak Fixer solution (manufactured by Eastman Kodak Company) containing 0.745% silver was shaken for four hours, then washed and dried at 60° C. The yarn contained 30.79% silver.

EXAMPLE 2

A cellulose acetate textile tow consisting of 23,800 crimped, 2.1 denier per filament fibers was drawn through an air banding jet and a vertical roll plasticizer applicator typical of the type used to apply plasticizer to cellulose acetate tow during the manufacture of cigarette filters. The linear speed of the tow at the application was 30 feet per minute. A water solution of 30% zinc chloride was pumped through the applicator onto the tow at a rate of 38 milliliters per minute. The dried tow contained 8.65% zinc as zinc chloride. The treated tow was soaked in 10 parts of a water solution containing 10% sodium sulfide and 11.8% sodium hydroxide for two minutes, then water washed and dried. The tow contained 11.55% zinc as zinc sulfide. After treating in a silver-containing solution as in Example 1, a 150 milligram sample contained 31.45% silver.

EXAMPLE 3

Fibers of cellulose acetate propionate (spun from cellulose propionate CAP 141 manufactured by Tennessee Eastman Company) are drawn across the top surface of a rotating lubricating roll. The lower surface of the roll is immersed in a water solution containing 30% zinc chloride. The fibers pick up solution from the roll and, after drying, contain about 10% zinc. The treated fibers are soaked for about five minutes in an aqueous solution of 10.6% sodium sulfide and 12.5% sodium hydroxide, then water washed and dried at room temperature. A 150 milligram sample of fiber in a vial containing 25 milliliters of Kodak Fixer solution (manufactured by Eastman Kodak Company) containing 0.745% silver is shaken for four hours, then washed and dried at 60° C. The fiber contains about 32% silver.

EXAMPLE 4

Cellulose tripropionate (10 parts) is dissolved in acetone. Zinc chloride (3 parts) is dissolved in 10 parts ethanol. The ethanolic solution is added to the cellulose ester solution with mixing, then the solution is cast onto a glass plate. After the acetone is evaporated, the resulting film is treated for five minutes with an aqueous solution of 15% ammonium hydroxide. The film is then washed and dried. The film sorbs about 20% of its weight in silver from an aqueous silver nitrate solution.

EXAMPLE 5

Example 3 is repeated except cellulose tributyrate is substituted for the cellulose tripropionate. The product sorbs about 18% silver from an aqueous silver nitrate solution.

EXAMPLE 6

Example 3 is repeated except cellulose acetate butyrate (CAB 171-25 manufactured by Tennessee Eastman Company) is substituted for the cellulose tripropionate. The product sorbs about 15% silver from an aqueous solution of silver nitrate.

EXAMPLE 7

Viscose rayon fibers (25 grams), 3 denier/filament, were soaked for three minutes in a solution of 600 milliliters of 30% zinc chloride in water. The fibers were squeezed to a wet weight of about 100 grams. The fibers were air dried, then slurried for about three minutes in an aqueous solution containing 9.4% sodium sulfide and 11% sodium hydroxide. The fibers were then water washed and dried. They contained about 22% zinc and about 11% silver.

Samples (150 milligrams each) were shaken with 25 milliliters of photographic fixer solution containing 7.45 grams silver chloride per liter. After 10 minutes the fibers contained about 15% silver based on the original weight of the sulfide. After 30 minutes and four hours, the fibers sorbed 24% and 49% silver respectively.

EXAMPLE 8

Viscose rayon fibers (20 grams) Avtex-Avril (F 40, HWM Bright, 1.5 denier/filament, 1-9/16 inch staple fibers) were slurried in 500 milliliters of 50% aqueous zinc chloride for five minutes, filtered and air dried. The fibers were treated as in Example 7.

A 150 milligram sample was treated with silver chloride as in Example 7. After four hours the fiber sorbed about 35% silver.

EXAMPLE 9

Baler twine (Mexican sisal) was washed in diethyl ether to remove lubricants and allowed to air dry. The twine was then vacuum dried at 50° to 60° C. for two hours and allowed to cool to room temperature in a closed container. Then 2.6 grams of the twine were soaked for 10 minutes in 30% zinc chloride (aqueous), removed, and excess solution was pressed out. A vacuum dried sample contained 16.1% zinc. The treated twine was then soaked in a mixture consisting of 9.7% sodium sulfide, 11.6% sodium hydroxide and 78.7% water. The material was then water washed until neutral pH was obtained. The dried sample contained 9.4% zinc.

Samples of 150 to 200 milligrams each were shaken with 25 milliliters of a photographic fixer solution containing 7.45 grams silver chloride per liter. After 10 minutes the fibers contained about 6.9% silver, after one hour the fibers contained about 19.7% silver and after four hours the fibers contained about 24.8% silver.

EXAMPLE 10

A 5 gram sample of burlap (origin unknown) was treated in the same manner as in Example 9. The dried sample contained about 12.4% zinc as the sulfide. The material was tested for silver sorption in the same manner as in Example 9. After 10 minutes the fibers contained about 8.0% silver and after four hours the fiber contained about 23.7% silver.

EXAMPLE 11

A sample of Manila hemp rope was treated in the same manner as in Example 9 and was tested for silver sorption. The dried sample contained about 9.0% zinc as the sulfide. After 10 minutes the fibers contained about 4.5% silver and after four hours the fibers contained about 16.7% silver.

EXAMPLE 12

Two grams of cotton (Hercules Lot 331) were treated in the same manner as in Example 9 and tested for silver sorption. After 10 minutes the cotton contained about 6.7% silver and after four hours the cotton contained about 16.7% silver.

EXAMPLE 13

A 3 gram sample of wood pulp (Florocrien F) was also treated in the same manner as in Example 9 and tested for silver sorption. The dried sample contained about 6.4% zinc as the sulfide. After four hours the wood pulp contained about 1.9% silver.

The following example results from treating a hydrophilic substrate with a metal chloride salt dissolved in an aliphatic alcohol, such as methanol.

EXAMPLE 14

A cellulose acetate textile tow consisting of 23,800 crimped, 2.1 denier per filament fibers is drawn through an air banding jet which spreads the tow into a band about 8 inches wide. A solution of 20% zinc chloride in methanol is sprayed onto the tow from a paint spray gun. After evaporation of the methanol, the tow is wetted with a solution of 16% sodium sulfide in water for two minutes, then water washed and dried. A 150 milligram sample is treated with a silver solution as in Example 1; the sample contains about 27% silver.

The invention has been described in detail with particular reference to preferred embodiments thereof, but it will be understood that variations and modifications can be effected within the spirit and scope of the invention.

I claim:

1. The method of making a hydrophilic substrate for sorbing by ion exchange heavy metals comprising: incorporating in a hydrophilic polymeric substrate a metal chloride selected from the group consisting of zinc chloride, ferric chloride, ferrous chloride, cupric chloride and cuprous chloride; said hydrophilic polymeric substrate being formed from a water insoluble hydrophilic polymer selected from the group consisting of cellulose esters, cellulose ethers, starches cross-linked to render them water insoluble, regenerated cellulose, and natural polymers selected from the group consisting of wood pulp, cotton, hemp, jute, sisal, flax, kapok and coconut shell fibers; said metal chloride being incorporated in said hydrophilic polymeric substrate by treating said substrate with a solution containing about 20 to about 70% metal chloride; and then treating said metal chloride incorporated substrate with a sulfide donor selected from the group consisting of hydrogen sulfide, or an aqueous solution of sodium sulfide, potassium sulfide, ammonia sulfide and thioacetamide to convert said metal chloride to a dispersion of a finely precipitated metal sulfide within said substrate; said finely precipitated metal sulfide comprising about 5 to about 50% by weight metal sulfide.

2. The method as defined according to claim 1, wherein the solution contains about 25 to about 45% metal chloride.

3. The method as defined according to claim 1, wherein said hydrophilic substrate comprises about 15 to about 40% by weight metal sulfide.

4. The method as defined according to claim 1, wherein said sulfide donor is a water soluble salt comprising about 1% to a saturated solution in said aqueous solution for treating said hydrophilic substrate.

5. The method as defined according to claim 1, wherein said sulfide donor is a water soluble salt comprising about 5% to a saturated solution in said aqueous solution for treating said hydrophilic material.

6. The method as defined according to claim 1, wherein said hydrophilic polymeric substrate is a cellulose ester and said metal chloride is incorporated in said substrate by dissolving said cellulose ester and said metal chloride in a volatile solvent for said cellulose ester to form a liquid solution, forming a substrate from the liquid solution and evaporating said volatile solvent.

7. The method as defined according to claim 6, wherein said cellulose ester is selected from cellulose acetate, cellulose butyrate, cellulose propionate or mixed esters thereof.

8. The method as defined according to claim 6, wherein said volatile solvent is selected from acetone or methylene chloride containing about 10% methanol.

9. The method as defined according to claim 1, wherein said regenerated cellulose is viscose rayon.

10. The method as defined according to claim 1, wherein said cellulose ether is a water insoluble hydroxy ethyl cellulose.

11. A hydrophilic substrate for sorbing heavy metals and made in accordance with the method defined in claim 1.

12. A hydrophilic substrate for sorbing heavy metals and made in accordance with the method defined in claim 6.

13. A hydrophilic substrate for sorbing heavy metals and made in accordance with the method defined in claim 9.

14. A hydrophilic substrate for sorbing heavy metals and made in accordance with the method defined in claim 10.

* * * * *